United States Patent [19]

Powell et al.

[11] 4,007,769
[45] * Feb. 15, 1977

[54] TIRE AND WHEEL ASSEMBLIES

[75] Inventors: Leslie Vernon Powell, Lichfield; Reginald Harold Edwards, Sutton Coldfield, both of England

[73] Assignee: Dunlop Holdings Limited, London, England

[*] Notice: The portion of the term of this patent subsequent to June 19, 1990, has been disclaimed.

[22] Filed: Oct. 29, 1975

[21] Appl. No.: 626,707

Related U.S. Application Data

[63] Continuation of Ser. No. 443,530, Feb. 19, 1974, abandoned, which is a continuation of Ser. No. 150,558, June 7, 1971, abandoned.

[30] Foreign Application Priority Data

June 20, 1970 United Kingdom ............ 30034/70

[52] U.S. Cl. .................. 152/330 RF; 152/330 L; 152/379 S; 152/381 A
[51] Int. Cl.² ........................... B60C 17/00
[58] Field of Search ......... 152/158, 353 R, 379 R, 152/379 S, 384, 385, 386, 330 RF, 330 L; 252/28

[56] References Cited

UNITED STATES PATENTS

| | | | |
|---|---|---|---|
| 2,040,645 | 5/1936 | Dickinson | 152/330 L |
| 2,987,093 | 6/1961 | Urbon | 152/330 L |
| 3,392,772 | 7/1968 | Powers | 152/330 L |
| 3,526,594 | 9/1970 | Meghir | 152/330 L |
| 3,610,308 | 10/1971 | McDonald | 152/330 L |
| 3,669,174 | 6/1972 | Mills | 152/379 S |

*Primary Examiner*—Drayton E. Hoffman
*Attorney, Agent, or Firm*—Stevens, Davis, Miller & Mosher

[57] ABSTRACT

A pneumatic tire having a coating of lubricating material on the interior surface thereof to reduce friction between the contacting portions of the interior surfaces when the tire is used in a deflated condition. The coating may be on only the contacting portions of the internal surfaces which so come into contact, of which the following is a specification.

18 Claims, 4 Drawing Figures

TIRE AND WHEEL ASSEMBLIES

This is a continuation of application Ser. No. 443,530 filed Feb. 19, 1974 which in turn is a continuation of Ser. No. 150,558 filed June 7, 1971.

This invention relates tire and wheel assemblies.

Upon partial or complete deflation of a pneumatic tire mounted on a wheel during the running of a vehicle opposite surfaces in the interior of the tire come into contact with one another under more or less load according to whether or not the deflation is complete; the regions of the interior surfaces which normally come into contact are the interior surfaces of the tire close to but radially outwardly of the rim flanges and the interior surfaces of the tire close to but radially inwardly of the tread edge.

When the surfaces come into contact considerable heat is generated within the rubber and textile components of the tire and very rapid structural failure ensues. It has been discovered that the major source of heat generated is caused by the relative movement of the surfaces in contact and under load and the temperature rise is particularly marked because of the high co-efficient of friction of dry rubber to dry rubber.

According to the present invention a single chamber pneumatic tire is provided with an interior surface having thereon a coating of lubricating material whereby in use of the tire in a deflated or substantially under-inflated condition friction between contacting interior surfaces of the tire is reduced.

The lubricating material may be a liquid material insoluble in rubber incorporated in the rubber compound of the inner liner of a tubeless tire, the material, e.g. castor oil, migrating gradually to the exposed surface of the liner and remaining thereon to act as a lubricant.

Alternatively, the coating of lubricating material may be a coating applied to the exposed surface of the interior of the tire, e.g. a coating of solid particles of p.t.f.e. (poly-tetra-fluoro-ethylene).

Instead of being applied in the form of a solid the lubricating material may be applied in the form of a gel but the lubricating material should not be capable of flowing away from the surfaces on which it is applied.

The tire advantageously has a relatively low aspect ratio e.g. between 30 percent and 75 percent to lessen the difference in ride height of the tire between the inflated and the deflated condition aspect ratio's in the range 55 percent and 70 percent being preferred. It is also preferred that the tire should have a tread width greater than the width between flanges of the wheel rim for which the tire is designed.

The lubricating material may be applied to the whole of the interior surfaces of the tire or, alternatively, may be applied to the interior surfaces of the tire which come into contact when the tire is deflated i.e. the interior surfaces of the tire close to but radially outwardly of the rim flange and the interior surfaces of the tire close to but radially inwardly of the tread edge.

The coating of lubricating material should be able satisfactorily to withstand temperatures of at least 145° C without deterioration of the coating or its lubricating properties since when used in a deflated condition the tire may attain such high temperatures. The thickness of the coating will depend on the particular lubricant used but will generally be in the range 0.001 to 0.025 inches.

The tire of this invention is preferably used in a tire and wheel assembly which is designed to prevent the tire beads from being dislodged from their seats. The wheel rim may thus be a flat-based rim i.e. a rim without a well into which the tire beads can fall. When using this type of rim if the beads are dislodged from their seats they tend to return to their correct positions during rotation of the tire.

If desired bead retaining means may be provided for physically restraining at least the laterally outer bead from moving from its seat, suitable means being for example a bead spacer ring, or removable studs or projections on the wheel rim. The use of bead retaining means enables a well-base rim to be used in the assembly if desired.

An example of the tire of this invention will now be described in more detail, by way of example only, with reference to the accompanying drawings, of which:

Figure 1:
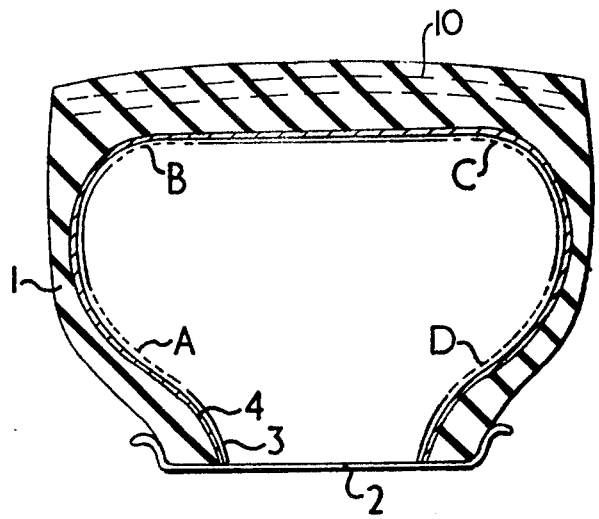
FIG. 1 shows in section a tire inflated and mounted on a flat base wheel rim.
Figure 3:
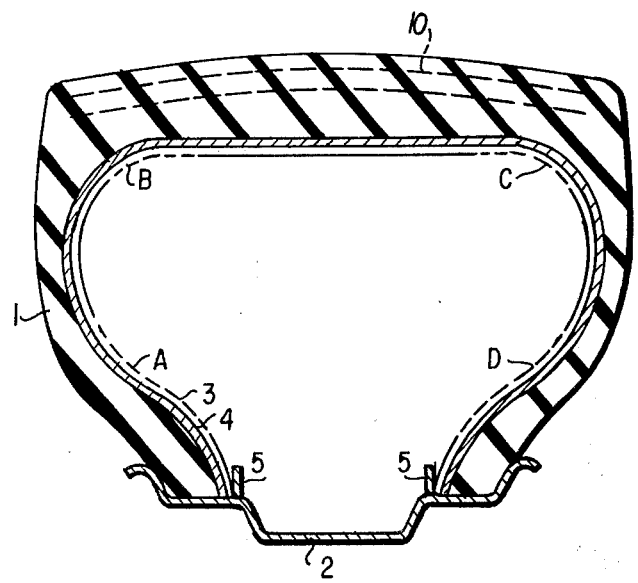
FIG. 3 shows in section a tire inflated and mounted on a wheel rim having a well.
Figure 4:
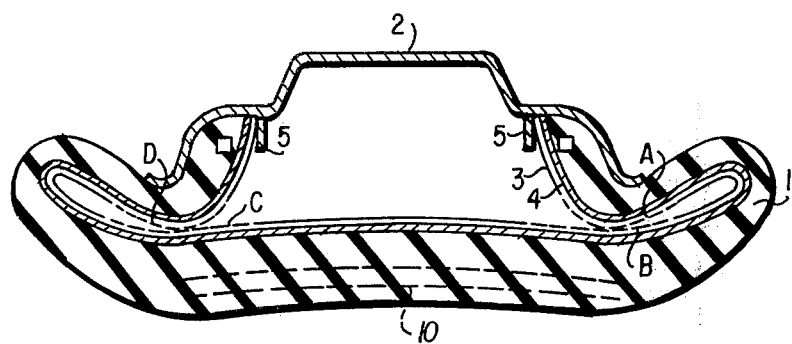
FIG. 4 shows the tire and wheel rim of FIG. 3 in the deflated condition and compressed as when it is passing through the ground contact patch.

As shown in FIG. 1 a pneumatic tire 1 is mounted on a flat base wheel rim shown schematically at 2. The wheel rim may be, for example, a rim in which a well has been closed by axial compression or a split rim. Also, as shown in FIG. 3, the wheel rim 2 may have a well. The whole of the interior surfaces of the tire are provided with a layer 3 of rubber having castor oil absorbed therein the castor oil migrating to the exposed surface of the layer to act as a lubricant thereon.

As shown in the drawings, bead retaining means are provided for physically restraining at least the laterally outer bead from moving from its seat, suitable means being removable studs or projections, such as those designated 5 in the figures, on the wheel rim 2.

The rubber composition of the layer has the following formulation:

| | Parts by Weight |
|---|---|
| Natural rubber | 100 |
| Sulphur | 2.75 |
| Santocure | 1.0 |
| Stearic Acid | 1.0 |
| Castor Oil | 25.0 |
| Zinc oxide | 5.0 |
| GPF Black (ASTM number N 660 obtained from Columbian International) | 60.0 |
| | 194.75 |

Between this layer and the remainder of the tire carcass there is provided a barrier layer 4 of a rubber composition which is impermeable by the lubricating material to prevent the lubricating material migrating to the carcass during use of the tire. Thus any risk of the lubricating material degrading the materials of the tire carcass and causing tire failure is obviated.

The barrier layer is made of the following rubber composition:

|  | Parts by Weight |
| --- | --- |
| Natural Rubber | 100 |
| Sulphur | 2.75 |
| Stearic Acid | 1.0 |
| Santocure | 1.0 |
| Mineral Oil | 5.0 |
| Zinc Oxide | 5.0 |
| GPF Black (ASTM number N 660 obtained from Columbian International) | 50.0 |
|  | 164.75 |

While the above rubber compositions refer to the use of natural rubber, compositions incorporating synthetic rubber polymers may also be used.

Referring still to FIG. 1 the portions A and B, C and D of the layer 3 which are shown in dotted lines may be provided alone if desired. In this case the lubricant layer is positioned only on the internal surfaces of the tire which come into intimate contact when the tire is used in the deflated or substantially underinflated state.

Figure 2:
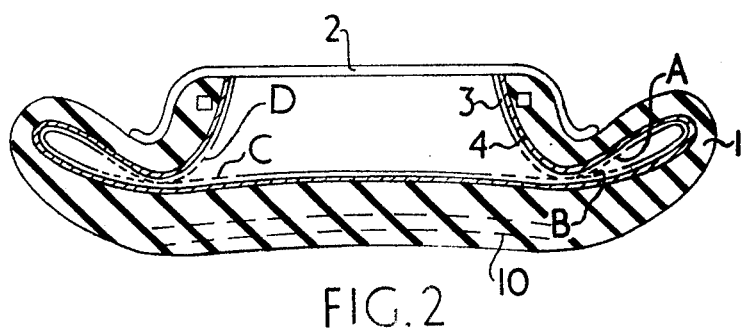
FIG. 2 shows the tire and wheel rim of FIG. 1 in the deflated condition and compressed as when it is passing through the ground contact patch

FIG. 2 shows the tire in the deflated condition collapsed on to the rim in the manner in which it will appear in the tire/ground contact patch and it will be noted that in this condition the portions A and B, also C and D are in contact.

The invention applies to tire and wheel assemblies in which the tire can be removed from the rim or, alternatively, when the tire is not removable therefrom, the two form a permanent assembly, for example, when the rim is swaged over the tire beads after assembly of the tire and rim.

This invention is applicable in particular to tires having a breaker assembly and a carcass of radial cords but can be applied to carcasses of cross-bias cords with or without breaker assemblies.

The present invention may be used in conjunction with the inventions of our co-pending U.S. Pat. application Ser. Nos. 150,628 filed June 7, 1971 (now abandoned); 150,561 filed June 7, 1971 (now abandoned); and 154,326 filed June 18, 1971 now U.S. Pat. No. 3,739,829 issued June 19, 1973.

The present invention may also be used, with particular advantage, with many embodiments of the invention described in our co-pending U.S. Patent application No. 150,627 filed June 7, 1971 now abandoned in which is described a pneumatic tire and wheel assembly comprising an enclosing means for a lubricating material for the interior surfaces of the tire said lubricating material being releasable from the enclosing means into the inflation chamber defined by the tire and wheel upon substantial loss of inflation pressure or deflation of the tire. Use of the tire of the present invention in this tire and wheel assembly will ensure that the tire sustains no damage before the lubricating material released from the enclosing means is thoroughly dispersed round the tire.

Having now described our invention what we claim is:

1. A pneumatic tire and wheel assembly capable of running in a completely deflated condition in which opposing portions of the interior of the tire contact each other when run in that condition, said tire and wheel assembly comprising:

a wheel having a wheel rim with a pair of annular flanges, a pair of bead seats adjacent said flanges and a well to permit a tire to be mounted on the rim, means on said rim for physically restraining the beads to prevent the tire beads from falling into the well;

a pneumatic tire on said rim, said tire having a pair of beads each of which has a toe, a tread portion whose width is greater than the width of the wheel rim measured between the flanges, a breaker, an aspect ratio between 30% and 75%, a smoothly curved curvilinear interior surface extending from one bead toe to the other bead toe, the entire interior surface of the tire being free of intermediate protruding supporting structure;

said rim and said tire defining a single open inflation chamber therebetween, said chamber being free of intermediate supporting structure so that said tire can be run in a completely deflated condition on the rim with opposing portions of the interior of the tire in contact with each other;

an immobile coating of lubricating material disposed on the interior surface of the tire so that when the assembly is run in a completely deflated condition relative movement of contacting portions of the interior surface of the tire will be facilitated, without generation of an undue amount of heat, by the coating of lubricating material therebetween; and the combination of said tread portion, whose width is greater than the width of the wheel rim measured between the flanges, said breaker, said aspect ratio, said single open inflation chamber, the immobile coating, and said means for physically restraining the beads provides a tire and wheel assembly which will run in a completely deflated condition.

2. A pneumatic tire and wheel assembly as claimed in claim 1, wherein:

the aspect ratio is in the range of 55 to 70%.

3. A pneumatic tire and wheel assembly as claimed in claim 1, wherein:

the means for physically restraining the beads comprises a projection on the wheel rim.

4. A pneumatic tire and wheel assembly as claimed in claim 1, wherein:

the immobile coating of lubricating material is applied in the form of a gel.

5. A pneumatic tire and wheel assembly as claimed in claim 1, wherein:

the immobile coating of lubricating material extends over the entire interior surface of the tire.

6. A pneumatic tire and wheel assembly as claimed in claim 1, wherein:

the immobile coating is a solid particulate coating of polytetrafluoroethylene.

7. A pneumatic tire and wheel assembly capable of running in a completely deflated condition in which opposing portions of the interior of the tire contact each other when run in that condition, said tire and wheel assembly comprising:

a wheel having a wheel rim with a pair of annular flanges and, between said flanges, a substantially non-decreasing diameter so that the wheel rim is without a well into which the tire beads can fall, bead retaining means for restraining the beads from moving from their seats;

a pneumatic tire on said rim, said tire having a pair of beads each of which has a toe, a tread portion whose width is greater than the width of the wheel rim measured between the flanges, a breaker, an aspect ratio between 30% and 75%, a smoothly curved curvilinear interior surface extending from one bead toe to the other bead toe, the entire interior surface of the tire being free of intermediate protruding supporting structure;

said rim and said tire defining a single open inflation chamber therebetween, said chamber being free of intermediate supporting structure so that said tire can be run in a completely deflated condition on the rim with opposing portions of the interior of the tire in contact with each other;

an immobile coating of lubricating material disposed on the interior surface of the tire so that when the assembly is run in a completely deflated condition relative movement of contacting portions of the interior surface of the tire will be facilitated, without generation of an undue amount of heat, by the coating of lubricating material therebetween; and the combination of said tread portion, whose width is greater than the width of the wheel rim measured between the flanges, said breaker, said aspect ratio, said single open inflation chamber, the immobile coating, and said bead retaining means provides a tire and wheel assembly which will run in a completely deflated condition.

8. A pneumatic tire and wheel assembly as claimed in claim 7, wherein:

the aspect ratio is in the range of 55 to 70%.

9. A pneumatic tire and wheel assembly as claimed in claim 7, wherein:

the means for physically restraining the beads comprises a projection on the wheel rim.

10. A pneumatic tire and wheel assembly as claimed in claim 7, wherein:

the immobile coating of lubricating material is applied in the form of a gel.

11. A pneumatic tire and wheel assembly as claimed in claim 7, wherein:

the immobile coating of lubricating material extends over the entire interior surface of the tire.

12. A pneumatic tire and wheel assembly as claimed in claim 7, wherein:

the immobile coating is a solid particulate coating of polytetrafluoroethylene.

13. A pneumatic tire and wheel assembly capable of running in a completely deflated condition in which opposing portions of the interior of the tire contact each other when run in that condition, said tire and wheel assembly comprising:

a wheel having a wheel rim with a pair of annular flanges and, between said flanges, a flat horizontally extending base so that the wheel rim is without a well into which the tire beads can fall, bead retaining means for restraining the beads from moving from their seats;

a pneumatic tire on said rim, said tire having a pair of beads each of which has a toe, a tread portion whose width is greater than the width of the wheel rim measured between the flanges, a breaker, an aspect ratio between 30% and 75%, a smoothly curved curvilinear interior surface extending from one bead toe to the other bead toe, the entire interior surface of the tire being free of intermediate protruding supporting structure;

said rim and said tire defining a single open inflation chamber therebetween, said chamber being free of intermediate supporting structure so that said tire can be run in a completely deflated condition on the rim with opposing portions of the interior of the tire in contact with each other;

an immobile coating of lubricating material disposed on the interior surface of the tire so that when the assembly is run in a completely deflated condition relative movement of contacting portions of the interior surface of the tire will be facilitated, without generation of an undue amount of heat, by the coating of lubricating material therebetween; and the combination of said tread portion, whose width is greater than the width of the wheel rim measured between the flanges, said breaker, said aspect ratio, said single open inflation chamber, the immobile coating, and said bead retaining means provides a tire and wheel assembly which will run in a completely deflated condition.

14. A pneumatic tire and wheel assembly as claimed in claim 13, wherein:

the aspect ratio is in the range of 55 to 70%.

15. A pneumatic tire and wheel assembly as claimed in claim 13, wherein:

the means for physically restraining the beads comprises a projection on the wheel rim.

16. A pneumatic tire and wheel assembly as claimed in claim 13, wherein:

the immobile coating of lubricating material is applied in the form of a gel.

17. A pneumatic tire and wheel assembly as claimed in claim 13, wherein:

the immobile coating of lubricating material extends over the entire interior surface of the tire.

18. A pneumatic tire and wheel assembly as claimed in claim 13, wherein:

the immobile coating is a solid particulate coating of polytetrafluoroethylene.

* * * * *